(12) United States Patent
Kim et al.

(10) Patent No.: US 11,649,971 B2
(45) Date of Patent: May 16, 2023

(54) HEAT PUMP BOILER (71) Applicant: LG Electronics Inc., Seoul (KR)

(72) Inventors: Minsoo Kim, Seoul (KR); Jihyeong Ryu, Seoul (KR); Youngmin Lee, Seoul (KR); Eunjun Cho, Seoul (KR)

(73) Assignee: LG Electronics Inc., Seoul (KR)

(*) Notice: Subject to any disclaimer, the term of this patent is extended or adjusted under 35 U.S.C. 154(b) by 643 days.

(21) Appl. No.: 16/660,181

(22) Filed: Oct. 22, 2019

(65) Prior Publication Data
US 2020/0124293 A1 Apr. 23, 2020

(30) Foreign Application Priority Data

Oct. 22, 2018 (KR) .................. 10-2018-0126196

(51) Int. Cl.
F24D 17/00 (2022.01)
F24D 19/10 (2006.01)
F24H 1/20 (2022.01)
F24H 4/04 (2006.01)
F24H 8/00 (2022.01)

(52) U.S. Cl.
CPC ..... *F24D 17/0036* (2013.01); *F24D 19/1054* (2013.01); *F24H 1/205* (2013.01); *F24H 4/04* (2013.01); *F24H 8/00* (2013.01)

(58) Field of Classification Search
None
See application file for complete search history.

(56) References Cited

U.S. PATENT DOCUMENTS 2,630,685 A * 3/1953 Lewis .................. F25B 47/022
62/81
4,441,901 A 4/1984 Endoh
(Continued)

FOREIGN PATENT DOCUMENTS

EP 2532983 A2 * 12/2012 ......... F24D 19/0095
GB 2503781 A * 1/2014 ......... F24D 17/0031
(Continued)

OTHER PUBLICATIONS

English translation of KR 20180113367 A (Year: 2018).*
(Continued)

*Primary Examiner* — Steven S Anderson, II
*Assistant Examiner* — Kurt J Wolford
(74) *Attorney, Agent, or Firm* — Fish & Richardson P.C.

(57) ABSTRACT

A heat pump boiler is disclosed. The heat pump boiler includes a compressor. The heat pump boiler further includes an exterior heat exchanger that is configured to transfer heat between refrigerant and exterior air. The heat pump boiler further includes an interior heat exchanger that is configured to transfer heat between refrigerant and water. The heat pump boiler further includes a channel change valve that is configured to provide refrigerant compressed by the compressor to the exterior heat exchanger or the interior heat exchanger. The heat pump boiler further includes a first boiler heat exchanger that is configured to heat water that has passed through the interior heat exchanger from heat generated through combustion. The heat pump boiler further includes a second boiler heat exchanger that is configured to transfer heat between refrigerant and gas discharged from the first boiler heat exchanger.

8 Claims, 7 Drawing Sheets (56) References Cited

U.S. PATENT DOCUMENTS

| | | | | |
|---|---|---|---|---|
| 2013/0104574 A1* | 5/2013 | Dempsey | ................ | F24D 17/02 |
| | | | | 62/159 |
| 2015/0219370 A1* | 8/2015 | Kato | ....................... | B29C 70/42 |
| | | | | 62/238.7 |
| 2020/0124357 A1* | 4/2020 | Kim | ......................... | F24H 6/00 |

FOREIGN PATENT DOCUMENTS

| | | | | |
|---|---|---|---|---|
| GB | 2532439 A | * 5/2016 | ......... | F24D 19/1039 |
| JP | 2012247167 | 12/2012 | | |
| KR | 20130130264 A | * 12/2013 | .............. | F24H 4/04 |
| KR | 20140115714 | 10/2014 | | |
| KR | 20150043830 | 4/2015 | | |
| KR | 20180113367 A | * 10/2018 | ............... | F24F 3/06 |
| WO | WO2010119318 A2 | 10/2010 | | |
| WO | WO2010119318 A3 | 3/2011 | | |
| WO | WO2014083440 | 6/2014 | | |

OTHER PUBLICATIONS

English translation of KR 20130130264 A (Year: 2013).*
This Old House (Year: 2018).*
This Old House Accessibility Date (Year: 2022).*
Extended European Search Report in European Appln. No. 19204573.0, dated Mar. 31, 20202, 8 pages.
Office Action in Korean Appln. No. 10-2018-0126196, dated Oct. 6, 2022, 13 pages (with English translation).

* cited by examiner

HEAT PUMP BOILER

CROSS-REFERENCE TO RELATED APPLICATION

This application claims the benefit of Korean Patent Application No. 10-2018-0126196, filed on Oct. 22, 2018, which is incorporated by reference.

FIELD

The present disclosure relates to a boiler including a heat pump.

BACKGROUND

A boiler or a heat pump may be used to heat an interior.

A boiler is a device that heats an interior by heating water using combustion heat, which is generated when fuel is burned, and supplying the heated water having heat to a heating demander through heating pipes installed in the interior, and supplies the heated water as hot water for a bathroom, a kitchen, etc.

A heat pump can heat an interior by heating the heating water using heat, which is generated in the process of phase change of a refrigerant, and supplying the heated water to a heating demander.

SUMMARY

A boiler has an advantage that it is possible to temporarily provide a large amount of heating heat, but there is a problem that a lot of cost is required to use fuel. Further, the heat pump generates heat by circulating a refrigerant by driving a compressor, so a low cost may be required in comparison to the boiler, but there is a defect that it is impossible to provide sufficient heating heat at very low temperature.

Accordingly, a heat pump boiler that separately or simultaneously uses a heat pump and a boiler by complementing the advantages and defects of a boiler and a heat pump is being developed.

In a heat pump boiler, there is a need for a separate defrosting process to remove frost that may be produced in an exterior heat exchanger due to driving of a heat pump.

However, in the structure described above, a refrigerant discharged from a compressor can be sent to an exterior heat exchanger by adjusting the flow direction of the refrigerant to perform a defrosting process, and in this case, heating water may be cooled through an interior heat exchanger. Accordingly, efficiency of interior heating is may decrease or the amount of fuel that is supplied to a boiler increases.

A first object of the present disclosure is to provide a heat pump boiler that does not stop a separate heating operation to perform defrosting operation for an exterior heat exchanger.

A second object of the present disclosure is to provide a heat pump boiler in which hybrid heating efficiency can be maintained by using heat that is used in existing boilers without introducing an additional heat source.

The objects of the present disclosure are not limited to the objects described above and other objects will be clearly understood by those skilled in the art from the following description.

According to an innovative aspect of the subject matter described in this specification, a heat pump boiler includes a compressor that is configured to compress refrigerant; an exterior heat exchanger that is configured to transfer heat between refrigerant and exterior air; an interior heat exchanger that is configured to transfer heat between refrigerant and water; a channel change valve that is configured to provide refrigerant compressed by the compressor to the exterior heat exchanger or the interior heat exchanger; a first boiler heat exchanger that is configured to heat water that has passed through the interior heat exchanger from heat generated through combustion; a second boiler heat exchanger that is configured to transfer heat between refrigerant and gas discharged from the first boiler heat exchanger; and a defrosting valve that is configured to provide refrigerant to the interior heat exchanger or the second boiler heat exchanger.

This implementation and other implementations may each include one or more of the following optional features. Based on the exterior heat exchanger operating as a condenser, the defrosting valve provides refrigerant discharged from the exterior heat exchanger to the second boiler heat exchanger. Based on the exterior heat exchanger operating as an evaporator, the defrosting valve provides refrigerant discharged from the compressor to the interior heat exchanger. The heat pump boiler includes an outdoor unit that includes the compressor, the exterior heat exchanger, and the channel change valve; an indoor unit that includes the interior heat exchanger, the first boiler heat exchanger, and the second boiler heat exchanger; a first refrigerant pipe that defines a channel for refrigerant that is discharged from the outdoor unit and provided to the indoor unit; and a second refrigerant pipe that defines a channel for a refrigerant that is discharged from the indoor unit and provided to the outdoor unit.

The defrost valve provides refrigerant provided from the outdoor unit through the first refrigerant pipe to the interior heat exchanger or the second boiler heat exchanger. The channel change valve includes a first channel change valve that is configured to provide refrigerant discharged from the compressor to the interior heat exchanger or the exterior heat exchanger; a second channel change valve that is configured to provide refrigerant discharged from the exterior heat exchanger to the compressor or the second boiler heat exchanger; and a third channel change valve that is configured to provide refrigerant discharged from the interior heat exchanger to the exterior heat exchanger or provide refrigerant discharged from the second boiler heat exchanger to the compressor. The defrosting valve is configured to provide, to the interior heat exchanger, refrigerant that is provided through the first channel change valve.

The defrosting valve is configured to provide, to the second boiler heat exchanger, refrigerant that is provided through the second channel change valve. The first boiler heat exchanger includes a sensible heat exchanger that heats water using heat generated through combustion; and a latent heat exchanger that heats water by absorbing condensation latent heat of an exhaust gas that has passes through the sensible heat exchanger. The second boiler heat exchanger is located downstream further than the latent heat exchanger in a traveling direction of gas that is burned in the first boiler heat exchanger. The heat pump boiler includes an exhauster that extends from the first boiler heat exchanger and that is configured to guide exhaust gas discharged by the first boiler heat exchanger. The second boiler heat exchanger is located in the exhauster.

The details of other implementations are included in the following detailed description and the accompanying drawings.

DETAILED DESCRIPTION

Figure 1:
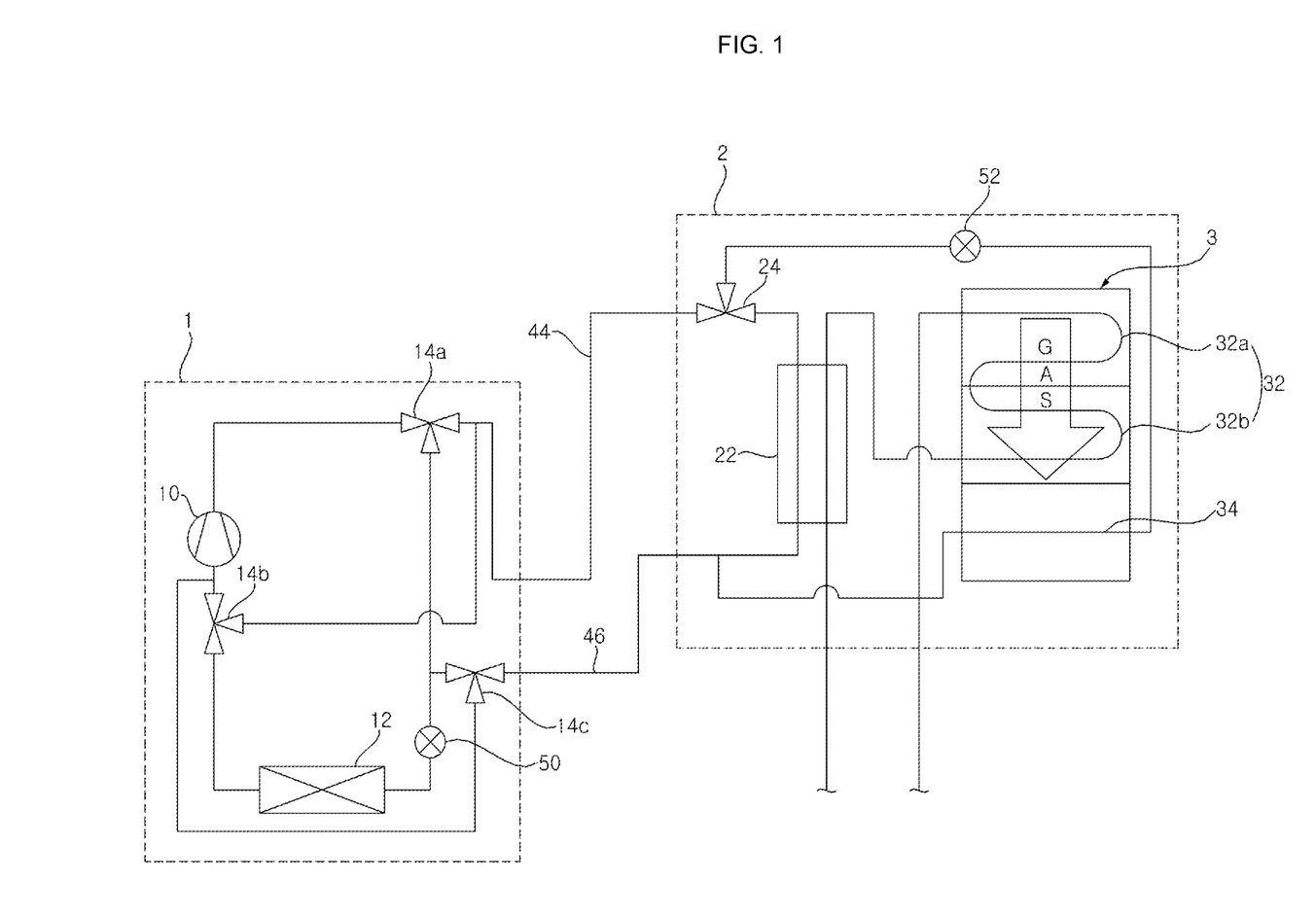
FIG. 1 is a schematic of an example heat pump boiler.
Figure 2A:
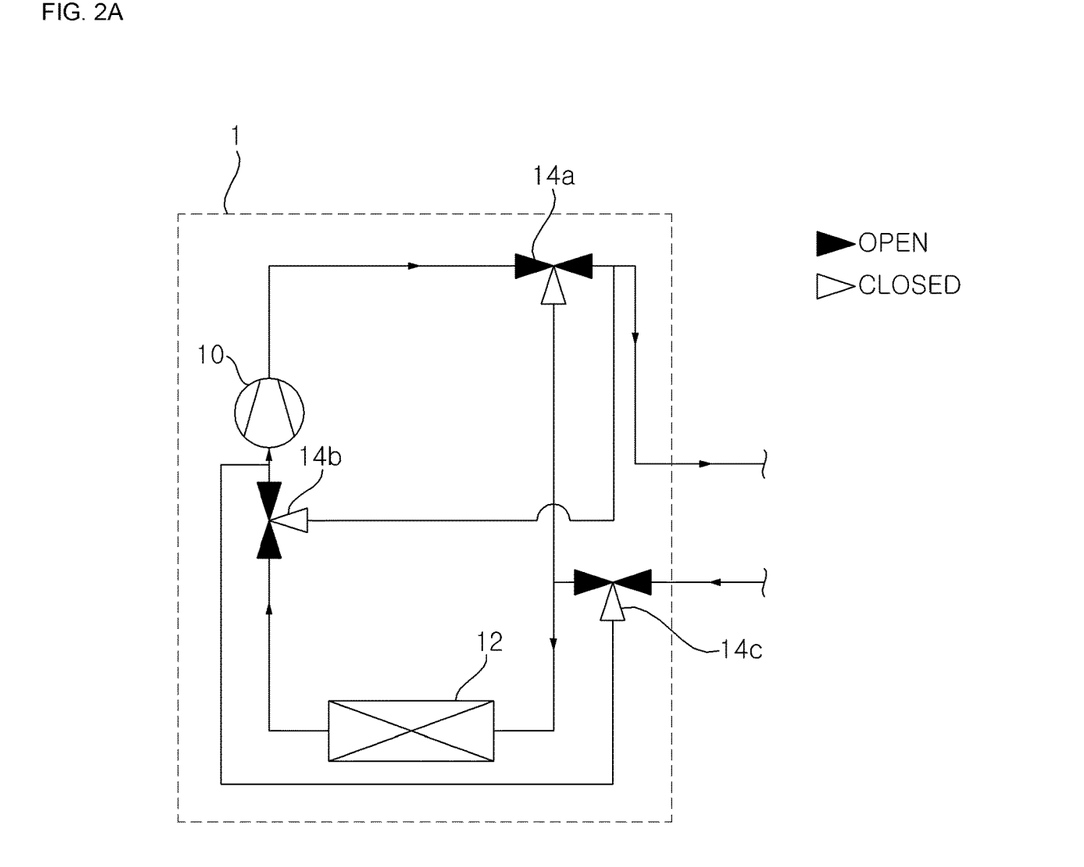
FIG. 2A illustrates refrigerant flow in an internal configuration of an outdoor unit in a hybrid heating mode of an example heat pump boiler.
Figure 2B:
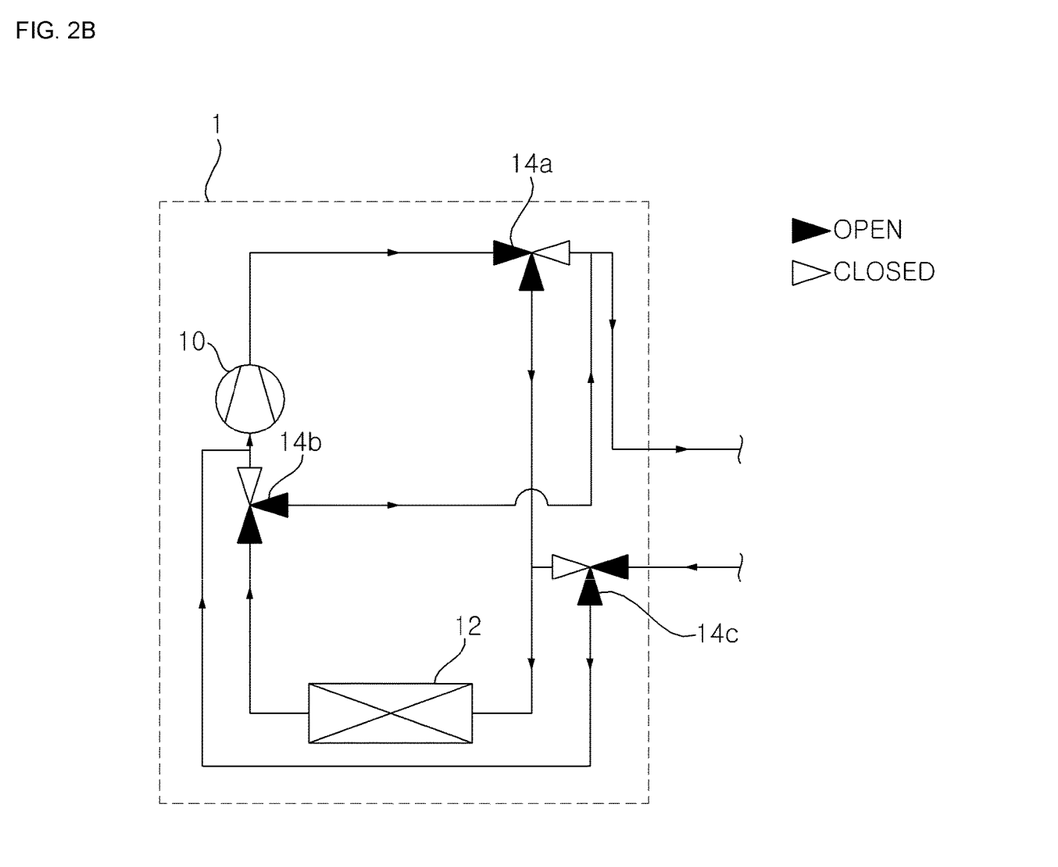
FIG. 2B illustrates refrigerant flow in an internal configuration of an outdoor unit in a defrosting-heating mode of an example heat pump boiler.
Figure 3:
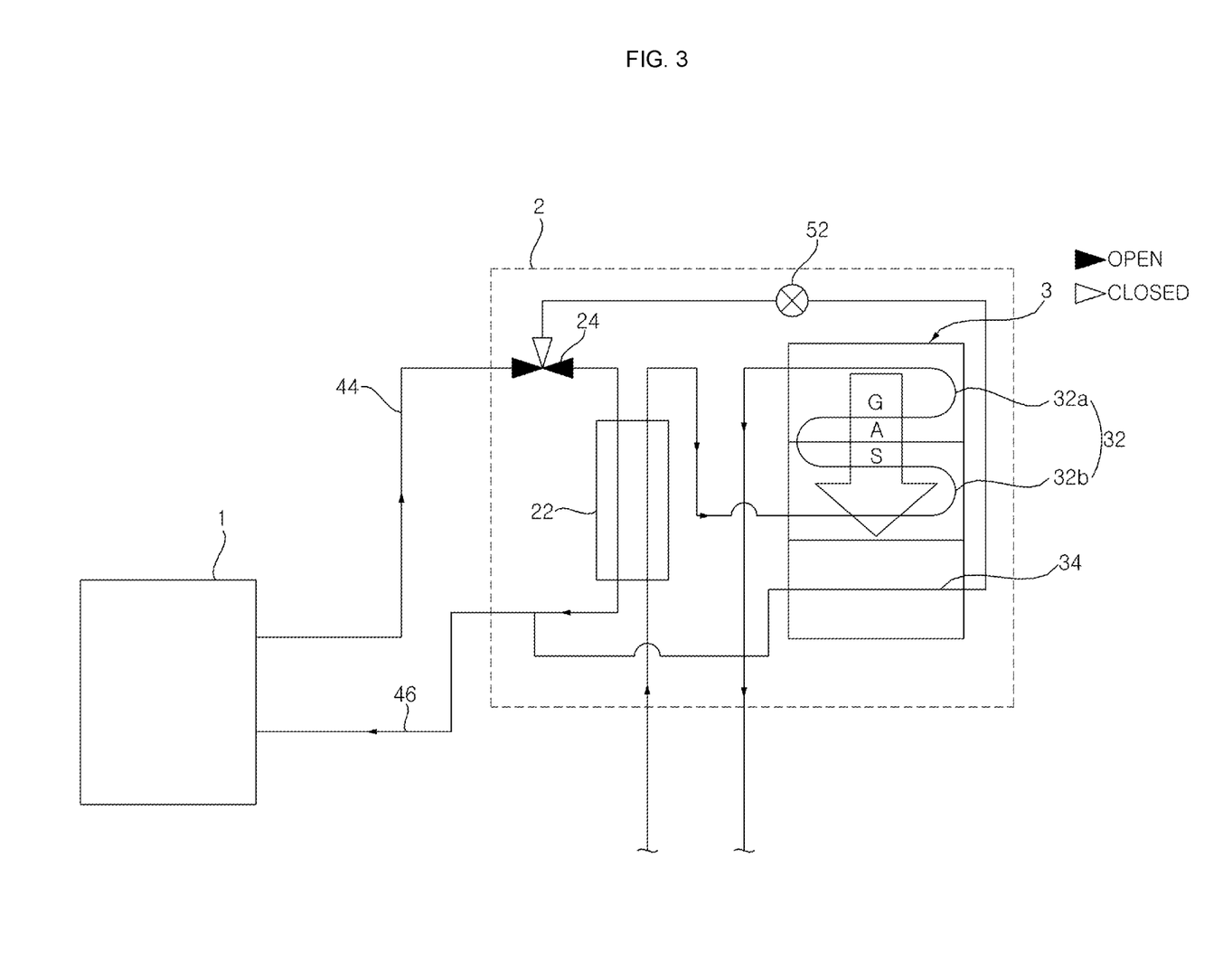
FIG. 3 illustrates flow of heating water and a refrigerant in the hybrid heating mode of an example heat pump boiler.
Figure 4:
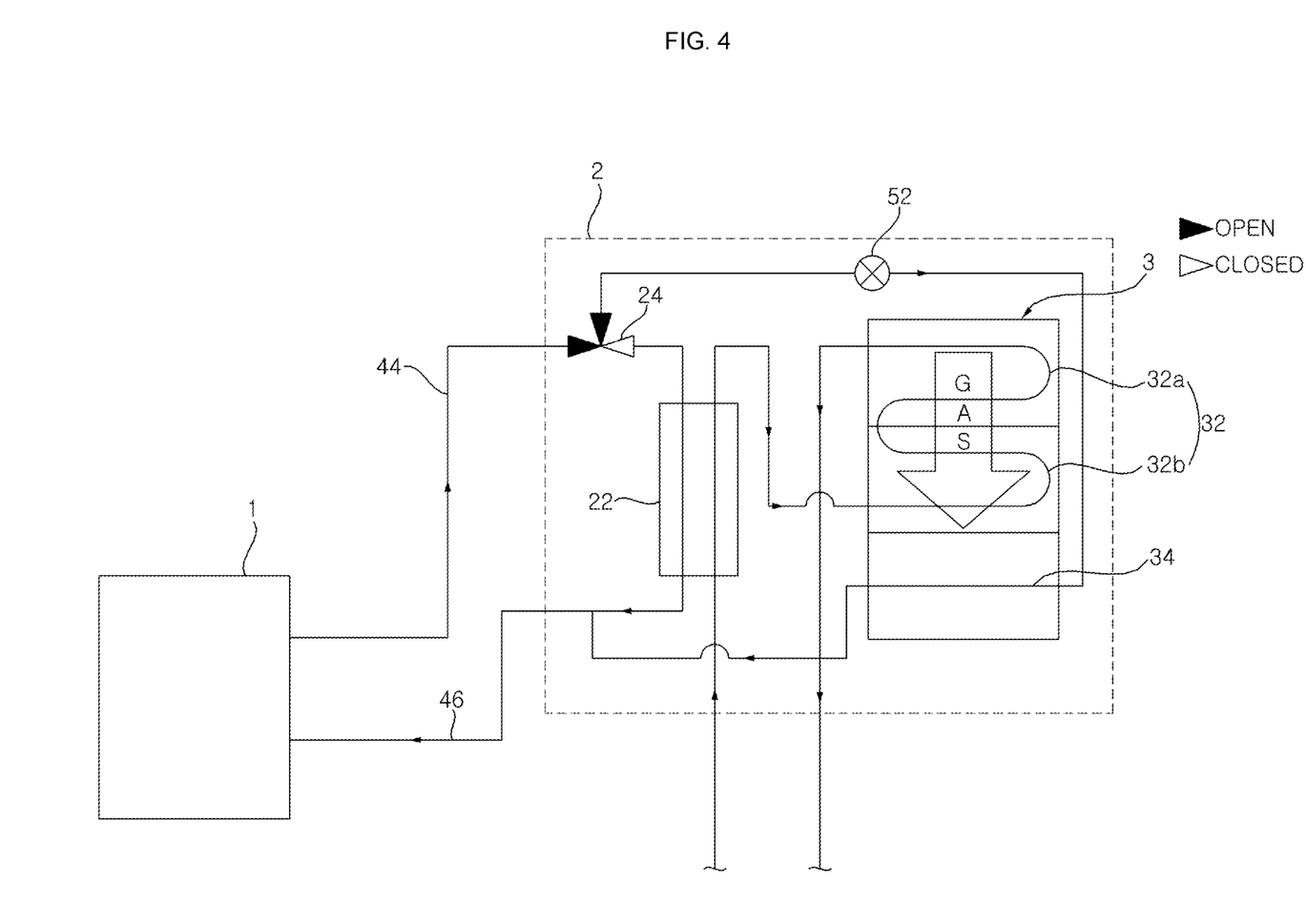
FIG. 4 illustrates flow of heating water and a refrigerant in the defrosting-heating mode of an example heat pump boiler.

FIG. 1 is a schematic configuration of an example heat pump boiler. FIG. 2A illustrates refrigerant flow in an internal configuration of an outdoor unit in a hybrid heating mode of an example heat pump boiler. FIG. 2B illustrates refrigerant flow in an internal configuration of an outdoor unit in a defrosting-heating mode of an example heat pump boiler. FIG. 3 illustrates flow of heating water and a refrigerant in the hybrid heating mode of an example heat pump boiler. FIG. 4 illustrates flow of heating water and a refrigerant in the defrosting-heating mode of an example heat pump boiler.

A heat pump boiler includes: a compressor 10 that compresses a refrigerant; an exterior heat exchanger 12 that allows for heat exchange between exterior air and a refrigerant; an interior heat exchanger 22 that allows for heat exchange between heating water and a refrigerant; channel change valves 14a, 14b, and 14c that send the refrigerant compressed by the compressor 10 to the interior heat exchanger 22 or the exterior heat exchanger 12; a first boiler heat exchanger 32 that heats heating water that has passed through the interior heat exchanger 22, using combustion heat; a second boiler heat exchanger 34 that allows heat exchange between a refrigerant and gas discharged through the first boiler heat exchanger 32; and a defrosting valve 24 that sends the refrigerant discharged from the exterior heat exchanger 12 to the second boiler heat exchanger 34 in a defrosting mode.

A heat pump boiler includes the interior heat exchanger 22 that heats heating water using heat exchange with a refrigerant, and the first boiler heat exchanger 32 that heats the heating water using combustion heat. In this configuration, the heating water means water as an example of a medium for supplying heat to a target to be heated, and fluid other than water may be used. The heating water is a medium that flows through the first boiler heat exchanger 32 or the interior heat exchanger 22 and is not discriminated from cold water or hot water.

The heat pump boiler can heat heating water through the interior heat exchanger 22 or can heat heating water through a boiler 3. Further, the heat pump boiler can heat the heating water using both of the interior heat exchanger 22 and the boiler 3.

The compressor 10 discharges a high-temperature and high-pressure refrigerant by compressing a refrigerant gas and may use a BLDC motor.

The interior heat exchanger 22 allows for heat exchange between the heating water and the refrigerant compressed and discharged from the compressor 10. A plate heat exchanger that allows for heat exchange between a refrigerant and heating water may be used as the interior heat exchanger 22.

The interior heat exchanger 22 may be used as a condenser that heats heating water by condensing a compressed liquid-state refrigerant. The interior heat exchanger 22 can primarily heat heating water that is supplied from a heating demander in a heating mode in which the compressor 10 is operated. The interior heat exchanger 22 may not be supplied with a refrigerant in a defrosting mode that removes frost in the exterior heat exchanger 12. Accordingly, in the defrosting mode, heating water and a refrigerant do not exchange heat in the interior heat exchanger 22. In the defrosting mode, heating water is not heated in the interior heat exchanger 22.

The exterior heat exchanger 12 can allow for heat exchange between external air and a refrigerant. The exterior heat exchanger 12 can function as an evaporator in which a refrigerant evaporates by taking heat from external air, in the heating mode that heats heating water using the interior heat exchanger 22.

However, when the exterior heat exchanger 12 is used as an evaporator at exterior temperature that is a predetermined temperature or less, frosting in which frost is produced outside the exterior heat exchanger 12 may occur. In the defrosting mode, the exterior heat exchanger 12 may be used as a condenser into which the refrigerant compressed by the compressor 10 flows. Accordingly, in the defrosting mode, the refrigerant compressed by the compressor 10 condenses, whereby frost can be removed.

The channel change valves 14a, 14b, and 14c can send the refrigerant discharged from the compressor 10 to the interior heat exchanger 22 or the exterior heat exchanger 12. The channel change valves 14a, 14b, and 14c are disposed as several pieces in an outdoor unit 1 to be described below and can adjust the refrigerant that is discharged from the compressor 10 and the refrigerant that flows into the refrigerator 10.

The channel change valves 14a, 14b, and 14c can change the flow direction of the refrigerant discharged from the compressor 10. The channel change valves 14a, 14b, and 14c can send the refrigerant discharged from the compressor 10 to the exterior heat exchanger 12 or the interior heat exchanger 22, depending on operation odes of the heat pump boiler.

The channel change valves 14a, 14b, and 14c may include a first channel change valve 14a that sends the refrigerant discharged from the compressor 10 to the interior heat exchanger 22 or the exterior heat exchanger 12, a second channel change valve 14b that sends the refrigerant discharged from the exterior heat exchanger 12 to the compressor 10 or the second boiler heat exchanger 34, and a third channel change valve 14c that sends the refrigerant discharged from the interior heat exchanger 22 to the exterior heat exchanger 12 or sends the refrigerant discharged from the second boiler heat exchanger 34 to the compressor 10.

The first boiler heat exchanger 32 can heat the heating water that is supplied to the heating demander using combustion heat. The combustion heat means heat that is generated by combustion of fuel and the fuel that is used in the boiler may include fossil fuel such as gas.

The first boiler heat exchanger 32 heats the heating water that flows inside through the interior heat exchanger 22. The first boiler heat exchanger 32 heats heating water, using combustion heat that is generated by hearing fuel that is supplied, and discharges gas used for combustion.

The first boiler heat exchanger 32 may include a heating water pipe forming a channel through which heating water flows, a combustor that heats the heating water pipe by burning fuel such as gas, and a exhauster to which the gas burned by the combustor is discharged.

The first boiler heat exchanger 32 may include a sensible heat exchanger 32a that directly heats heating water using combustion heat, and a latent heat exchanger 32b that heats heating water by absorbing again the condensation latent heat of an exhaust gas that has passed through the sensible heat exchanger 32a.

The second boiler heat exchanger 34 allows for heat exchange between exhaust gas discharged from the first boiler heat exchanger 32 and a refrigerant. That is, the second boiler heat exchanger 34 can function as an evaporator that evaporates a refrigerant using an exhaust gas discharged through the first boiler heat exchanger 32.

The second boiler heat exchanger 34 is disposed downstream further than the latent heat exchanger 32b in the traveling direction of gas that is burned. The second boiler heat exchanger 34 may be disposed at a side of the first boiler heat exchanger 32 in which the latent heat exchanger 32b is disposed.

The heat pump boiler may include a first expansion valve 50 that expands a refrigerant discharged from the interior heat exchanger 22 and flowing into the exterior heat exchanger 12; and a second expansion valve 52 that expands a refrigerant discharged from the exterior heat exchanger 12 and flowing into the second boiler heat exchanger 34. The first expansion valve 50 may be disposed between the interior heat exchanger 22 and the exterior heat exchanger 12, and the second expansion valve 52 may be disposed between the exterior heat exchanger 12 and the second boiler heat exchanger 34.

The first expansion valve 50 and the second expansion valve 52 may be adjusted to expand a refrigerator in accordance with the operation modes of the heat pump boiler.

The heat pump boiler 3 may include an indoor unit 2 that heats heating water using heat exchange with a refrigerant, and an outdoor unit 1 that is disposed in an exterior space and in which the exterior heat exchanger 12 allowing for heat exchange between external air and a refrigerant is disposed.

The indoor unit 2 is for discrimination from the outdoor unit and is not necessarily disposed in the interior. However, the outdoor unit 1 may be disposed in an interior space in terms of including the exterior heat exchanger 12 that allows for heat exchange with external air.

The exterior heat exchanger 12 is disposed in the indoor unit 2. In the indoor unit 2, other than the interior heat exchanger 22, the components of the boiler 3 that heats heating water using combustion heat may be disposed. That is, the interior heat exchanger 22, the first boiler heat exchanger 32, and second boiler heat exchanger 34 may be disposed in the indoor unit 2. However, the inside of the indoor unit 2 may be divided into a space in which the interior heat exchanger 22 is disposed and a space in which the first boiler heat exchanger 32 and the second boiler heat exchanger 34 are disposed.

The interior heat exchanger 22 that heats heating water using condensation heat of a refrigerant and the first boiler heat exchanger 32 that heats the heating water using combustion heat are disposed in the indoor unit 2. The second boiler heat exchanger 34 that evaporates a refrigerant using the exhaust gas discharged from the first boiler heat exchanger 32 may be disposed in the indoor unit 2.

Further, the defrosting valve 24 may be disposed in the indoor unit 2. The defrosting valve 24 can send the refrigerant flowing in the outdoor unit 1 to the interior heat exchanger 22 or the second boiler heat exchanger 34.

The compressor 10, the exterior heat exchanger 12, and the channel change valves 14a, 14b, and 14c are disposed in the outdoor unit 1. The first channel change valve 14a that sends the refrigerant discharged from the compressor 10 to the interior heat exchanger 22 or the exterior heat exchanger 12, the second channel change valve 14b that sends the refrigerant discharged from the exterior heat exchanger 12 to the compressor 10 or the second boiler heat exchanger 34, and the third channel change valve 14c that sends the refrigerant discharged from the interior heat exchanger 22 to the exterior heat exchanger 12 or sends the refrigerant discharged from the second boiler heat exchanger 34 to the compressor 10 may be disposed in the outdoor unit 1.

The heat pump boiler includes refrigerant pipes 44 and 46 for flow between the outdoor unit 1 and the indoor unit 2. The refrigerant pipes 44 and 46 include a first refrigerant pipe 44 that forms a refrigerant channel through which a refrigerant discharged from the outdoor unit 1 is supplied to the indoor unit 2, and a second refrigerant pipe 46 through which a refrigerant discharged from the indoor unit 2 is supplied to the outdoor unit.

The first refrigerant pipe 44 sends the refrigerant discharged from the compressor 10 through the first channel change valve 14a to the defrosting valve 24 or sends the refrigerant discharged from the exterior heat exchanger 12 through the second channel change valve 14b to the defrosting valve 24.

The second refrigerant pipe 46 sends the refrigerant discharged from the interior heat exchanger 22 to the third channel change valve 14c or sends the refrigerant discharged from the second boiler heat exchanger 34 to the third channel change valve 14c.

The first channel change valve 14a, the second channel change valve 14b, and the third channel change valve 14c are adjusted in accordance with the operation modes. The first channel change valve 14a, the second channel change valve 14b, and the third channel change valve 14c are adjusted such that the refrigerant compressed by the compressor 10 flows to the indoor unit 2 in the heating mode that heats heating water through the interior heat exchanger 22. Further, the first channel change valve 14a, the second channel change valve 14b, and the third channel change valve 14c are adjusted such that the refrigerant compressed by the compressor 10 flows to indoor unit 2 through the exterior heat exchanger 12 in the defrosting mode that removes frost produced in the exterior heat exchanger 12.

Referring to FIG. 2A, the first channel change valve 14a can connect the compressor 10 and the defrosting valve 24, the second channel change valve 14b can connect the exterior heat exchanger 12 and the compressor 10, and the third channel change valve 14c can connect the interior heat exchanger 22 and the exterior heat exchanger 12 to send the refrigerant discharged from the compressor 10 to the interior heat exchanger 22 in the hybrid heating mode.

Referring to FIG. 2B, the first channel change valve 14a can connect the compressor 10 and the exterior heat exchanger 12, the second channel change valve 14b can connect the exterior heat exchanger 12 and the defrosting valve 24, and the third channel change valve 14c can connect the second boiler heat exchanger 34 and the compressor 10 to send the refrigerant discharged from the compressor 10 to the exterior heat exchanger 12 in the defrosting-heating mode.

The heat pump boiler can be operated in the hybrid heating mode that primarily heats heating water through the interior heat exchanger 22 and secondarily heats the heating water through the first boiler heat exchanger 32, and the defrosting-heating mode that heats heating water through the first boiler heat exchanger 32 and removes frost produced in the exterior heat exchanger 12.

In each of the hybrid heating mode and the defrosting-heating mode, the compressor 10 is driven and heating water is heated in the first boiler heat exchanger 32.

Referring to FIG. 3, in the hybrid heating mode, the interior heat exchanger 22 functions as a condenser. Accordingly, the refrigerant flowing from the outdoor unit 1 flows to the interior heat exchanger 22, thereby being able to heat heating water.

In the hybrid heating mode, the refrigerant compressed by the compressor 10 can be discharged from the outdoor unit 1. In the hybrid heating mode, the defrosting valve 24 connects the compressor 10 and the interior heat exchanger 22. In the hybrid heating mode, the defrosting valve 24 sends the refrigerant flowing inside from the outdoor unit 1 to the interior heat exchanger 22. The refrigerant that has passed through the interior heat exchanger 22 is supplied back to the outdoor unit 1, thereby being able to flow to the exterior heat exchanger 12.

The heating water that is supplied to the heating demander can flow to the first boiler heat exchanger 32 through the interior heat exchanger 22. Accordingly, the heating water primarily heated through the interior heat exchanger 22 can be secondarily heated through the first boiler heat exchanger and then can be supplied to the heating demander.

Referring to FIG. 4, in the defrosting-heating mode, the second boiler heat exchanger 34 functions as an evaporator. Accordingly, the refrigerant flowing from the outdoor unit 1 can flow to the second boiler heat exchanger 34 and evaporate.

In the defrosting-heating mode, the refrigerant condensed through the exterior heat exchanger 12 can be discharged from the outdoor unit 1. In the defrosting-heating mode, the defrosting valve 24 connects the exterior heat exchanger 12 and the second boiler heat exchanger 34. In the defrosting-heating mode, the defrosting valve 24 sends the refrigerant flowing inside from the outdoor unit 1 to the second boiler heat exchanger 34. The refrigerant that has passed through the second boiler heat exchanger 34 is supplied to the outdoor unit 1, thereby being able to flow to the compressor 10.

The heating water that is supplied from the heating demander can be heated through the first boiler heat exchanger and supplied to the heating demander. The heating water that is supplied from the heating demander flows to the first boiler heat exchanger 32 through the interior heat exchanger 22, but a compressed refrigerant does not flow to the interior heat exchanger 22, so heat heating water is not specifically heated.

The heat pump boiler may be operated in a heat pump heating mode that heats heating water only through the interior heat exchanger 22, and a boiler heating mode that heats heating water only through the first boiler heat exchanger 32 without driving the compressor 10.

Figure 5:
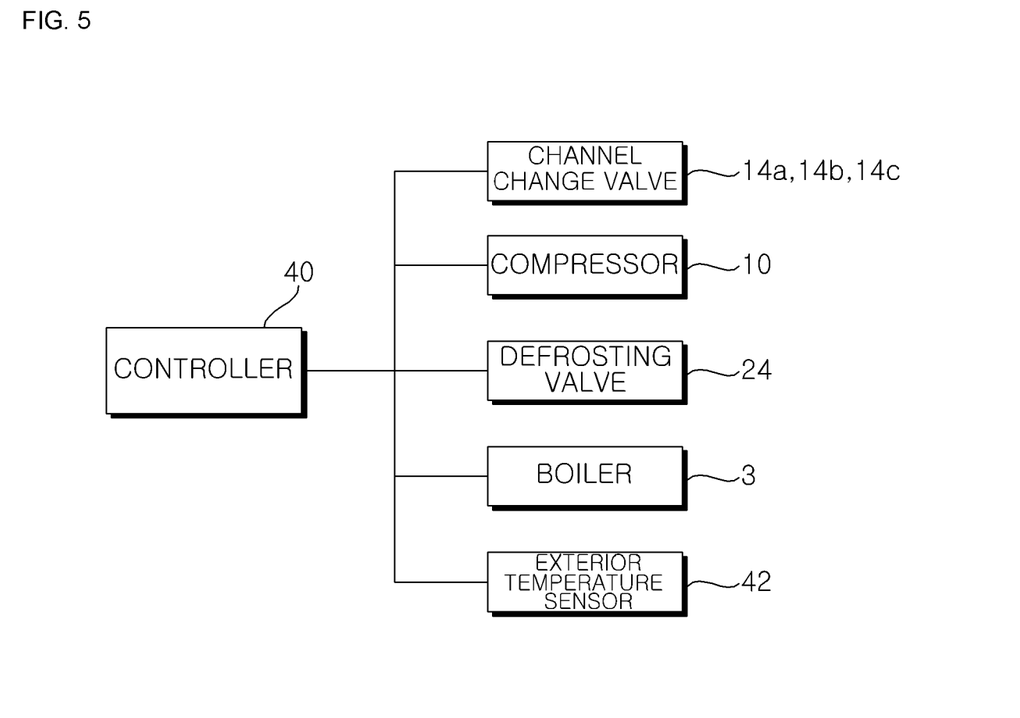
FIG. 5 is a block diagram of a controller and relevant components of an example heat pump boiler.

FIG. 5 is a block diagram of a controller and relevant components of an example heat pump boiler. Hereafter, a controller and relevant components are described with reference to FIG. 5.

The heat pump boiler includes a controller 40 that controls driving of the compressor 10 or combustion in the combustor, and adjusts the defrosting valve 24 in accordance with the operation modes.

The controller 40 can adjust the defrosting valve 24 in accordance with the operation modes of the heat pump boiler. Further, the controller can control the channel change valves 14a, 14b, and 14c in accordance with the operation modes of the heat pump boiler.

Referring to FIGS. 2A and 3, the controller 40 controls the first channel change valve 14a to connect the compressor 10 and the defrosting valve 24, the second channel change valve 14b to connect the exterior heat exchanger 12 and the compressor 10, the third channel change valve 14c to connect the interior heat exchanger 22 and the exterior heat exchanger 12, and the defrosting valve 24 to connect the compressor 10 and the interior heat exchanger 22 in the hybrid heating mode of the heat pump boiler.

Referring to FIGS. 2b and 4, the controller 40 controls the first channel change valve 14a to connect the compressor 10 and the exterior heat exchanger 12, the second channel change valve 14b to connect the exterior heat exchanger 12 and the defrosting valve 24, the third channel change valve 14c to connect the second boiler heat exchanger 34 and the compressor 10, and the defrosting valve 24 to connect the compressor 12 and the second boiler heat exchanger 34 in the defrosting-heating mode of the heat pump boiler.

The heat pump boiler may further include an exterior temperature sensor 42 that finds out exterior temperature. The controller 40 can adjust the channel change valves 14a, 14b, and 14c and the defrosting valve 24 in accordance with exterior temperature found out by the exterior temperature sensor 42.

Figure 6:
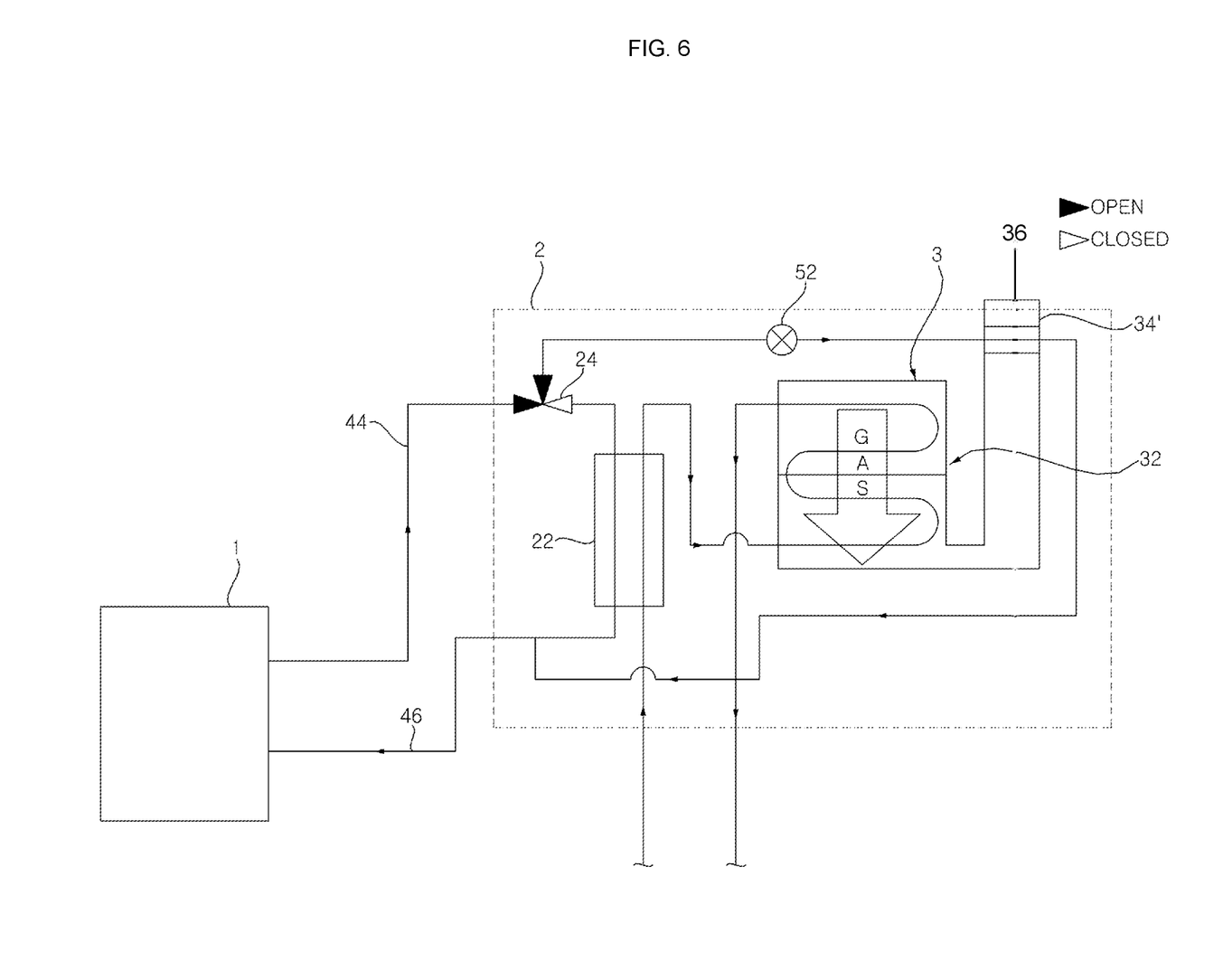
FIG. 6 is a schematic of an example heat pump boiler.

FIG. 6 is a schematic of an example heat pump boiler.

Hereafter, a heat pump boiler is described mainly on the basis of the difference from the heat pump boiler found out from FIGS. 1 to 4 with reference to FIG. 6.

A heat pump boiler includes: a first boiler heat exchanger 32 that heats a heating water using combustion heat; a combustor that provides combustion heat to the first boiler heat exchanger 32 by burning fuel; a exhauster 36 to which gas burned in the combustor is discharged; and a second boiler heat exchanger 34 that is disposed in the exhauster 36 and allows heat exchange between a refrigerant and an exhaust gas.

The exhauster 36 extends from the first boiler heat exchanger 32 and guides the exhaust gas discharged through the first boiler heat exchanger 32. The second boiler heat exchanger 34' may be disposed in the exhauster 36 to which an exhaust gas is discharged.

According to a heat pump boiler of the present disclosure, one or more effects can be achieved as follows.

First, the technology described above can continuously perform heating without stopping due to a defrosting operation in a heating operation, so there is also an advantage that it is possible to make a user feel pleasant.

Second, the technology described above can perform defrosting simultaneously with heating, using the heat of an exhaust gas from a boiler, so there is also an advantage that the cost required for using a separate heat source.

What is claimed is:
1. A heat pump boiler comprising:
a compressor that is configured to compress refrigerant;
an exterior heat exchanger that is configured to transfer heat between refrigerant and exterior air;

an interior heat exchanger that is configured to transfer heat between refrigerant and water;
a channel change valve that is configured to provide refrigerant compressed by the compressor to the exterior heat exchanger or the interior heat exchanger;
a first boiler heat exchanger that is configured to heat water that has passed through the interior heat exchanger from heat generated through combustion;
a second boiler heat exchanger that is configured to transfer heat between refrigerant and gas discharged from the first boiler heat exchanger;
a defrosting valve that is configured to provide refrigerant to the interior heat exchanger or the second boiler heat exchanger;
an outdoor unit that includes the compressor, the exterior heat exchanger, and the channel change valve;
an indoor unit that includes the interior heat exchanger, the first boiler heat exchanger, and the second boiler heat exchanger;
a first refrigerant pipe that defines a channel for refrigerant discharged from the outdoor unit and provided to the indoor unit; and
a second refrigerant pipe that defines a channel for a refrigerant discharged from the indoor unit and provided to the outdoor unit,
wherein the defrost valve provides refrigerant provided from the outdoor unit through the first refrigerant pipe to the interior heat exchanger or the second boiler heat exchanger.

2. The heat pump boiler of claim 1, wherein based on the exterior heat exchanger operating as a condenser, the defrosting valve provides refrigerant discharged from the exterior heat exchanger to the second boiler heat exchanger.

3. The heat pump boiler of claim 1, wherein based on the exterior heat exchanger operating as an evaporator, the defrosting valve provides refrigerant discharged from the compressor to the interior heat exchanger.

4. The heat pump boiler of claim 1, wherein the channel change valve includes:
a first channel change valve that is configured to provide refrigerant discharged from the compressor to the interior heat exchanger or the exterior heat exchanger;
a second channel change valve that is configured to provide refrigerant discharged from the exterior heat exchanger to the compressor or the second boiler heat exchanger; and
a third channel change valve that is configured to provide refrigerant discharged from the interior heat exchanger to the exterior heat exchanger or provide refrigerant discharged from the second boiler heat exchanger to the compressor.

5. The heat pump boiler of claim 4, wherein the defrosting valve is configured to provide, to the interior heat exchanger, refrigerant that is provided through the first channel change valve.

6. The heat pump boiler of claim 4, wherein the defrosting valve is configured to provide, to the second boiler heat exchanger, refrigerant that is provided through the second channel change valve.

7. The heat pump boiler of claim 1, wherein:
the first boiler heat exchanger includes:
a sensible heat exchanger that heats water using heat generated through combustion; and
a latent heat exchanger that heats water by absorbing condensation latent heat of an exhaust gas that has passed through the sensible heat exchanger, and
the second boiler heat exchanger is located downstream further than the latent heat exchanger in a traveling direction of gas that is burned in the first boiler heat exchanger.

8. The heat pump boiler of claim 1, comprising:
an exhauster that extends from the first boiler heat exchanger and that is configured to guide exhaust gas discharged by the first boiler heat exchanger,
wherein the second boiler heat exchanger is located in the exhauster.

* * * * *